United States Patent [19]
Takahashi et al.

[11] Patent Number: 5,355,363
[45] Date of Patent: Oct. 11, 1994

[54] VOICE TRANSMISSION METHOD AND APPARATUS IN DUPLEX RADIO SYSTEM

[75] Inventors: Katsumi Takahashi, Kodaira; Takashi Kurokawa, Hachioji; Nobuo Sekiguchi, Kodaira; Kazuo Suzuka, Sayama; Sakari Ohira, Sendai; Kiyoyuki Isawa, Kawasaki; Fujio Sumi, Tokyo; Kenichi Suzuki, Yokohama, all of Japan

[73] Assignees: Hitachi Denshi Kabushiki Kaisha, Tokyo; Tohoki Electric Power Co., Inc., Sendai; Fuji-Tekku Kabushiki Kaisha, Tokyo, all of Japan

[21] Appl. No.: 27,479

[22] Filed: Mar. 8, 1993

[30] Foreign Application Priority Data

Mar. 9, 1992 [JP] Japan .................................. 4-085020
Sep. 14, 1992 [JP] Japan .................................. 4-269133

[51] Int. Cl.$^5$ .............................................. H04B 1/56
[52] U.S. Cl. ..................................... 370/29; 370/109; 455/79; 455/84
[58] Field of Search ......................... 370/24, 29, 109; 455/73, 79, 84, 86, 87

[56] References Cited

U.S. PATENT DOCUMENTS 4,525,835  6/1985  Vance et al. .................. 370/29
4,930,126  5/1990  Kazecki et al. .................. 370/109

FOREIGN PATENT DOCUMENTS

91/02414  8/1989  European Pat. Off. .

Primary Examiner—Benedict V. Safourek
Attorney, Agent, or Firm—Antonelli, Terry, Stout & Kraus

[57] ABSTRACT

A voice transmission method and apparatus in a duplex radio system are disclosed in which a voice signal to be transmitted in a constant period of time is subjected to 1/N time compression, N being a numeral not smaller than 2.0. The time-compressed voice signal is supplied to a transmitter as a modulating signal and a transmitting operation is performed by the transmitter in synchronism with a period of time when the modulating signal is inputted to the transmitter. A receiving operation of receiving a time-compressed and modulated signal transmitted from the transmitter to demodulate it is performed by a receiver in a period of time other than the period of time when the transmitting operation is performed. A demodulated signal is subjected to N-ple time expansion to obtain a reproduced receive voice signal, and both the transmitting operation and the receiving operation are repeated at the constant period of time. In the voice transmission method and apparatus, a predetermined band of a signal corresponding to said signal to be transmitted, which is in a voice band, is extracted with a predetermined band width. The extracted signal is shifted to any band which is in the voice band and is other than the extracted band. A signal corresponding to the shifted signal is supplied to the transmitter as the modulating signal.

10 Claims, 12 Drawing Sheets

Ffil1   FREQUENCY

Fsc(2.1KHz)   FREQUENCY

Ffil2   Ffil1   FREQUENCY

Fc   FREQUENCY

VOICE TRANSMISSION METHOD AND APPARATUS IN DUPLEX RADIO SYSTEM

BACKGROUND OF THE INVENTION

1. Field of the Invention

The present invention relates to a voice transmission method and apparatus in a duplex (or simultaneous transmission and reception) radio system using one carrier frequency.

2. Description of the Related Art

An example of the construction of the conventional voice transmission apparatus in a single-frequency duplex radio system is shown in FIG. 1. Referring to FIG. 1, a voice signal to be transmitted or a transmit voice signal inputted to a transmit voice input terminal 6 is supplied through a time compression circuit 7 and a splatter filter 4 to a modulating circuit of a transmitter 14 as a signal which modulates a carrier frequency wave in the modulating circuit of the transmitter. On the other hand, a demodulated signal of a receiver 15 is outputted as a receive voice signal to a terminal 12 through a time expansion circuit 13. Also, a part of the demodulated output of the receiver 15 is inputted to a timing control circuit 16 through a sync extraction circuit 17. The transmitter 14, the receiver 15, the time compression circuit 7 and the time expansion circuit 13 are controlled by control signals from the timing control circuit 16.

The operation of the radio system shown in FIG. 1 will now be explained briefly by use of FIG. 2. A voice signal to be transmitted, as shown by (a) in FIG. 2, is subjected to 1/N (for example, ½) time compression at every constant period of time T to obtain a time-compressed voice signal as shown by (b) in FIG. 2. As a result, a block for compression and a block for pause are generated in the constant time T. The compression block and the pause block are respectively allotted to a transmitting time and a receiving time so as to effect the transmission and reception of a compressed voice signal, as shown by (c) in FIG. 2. In FIG. 2, (d) shows a compressed voice signal received. This signal is time-expanded to two times so that it is restored to a continuous voice signal as shown by (e) in FIG. 2.

The timing for change-over between the time compression and expansion and the timing for change-over between the transmitting and receiving operations are controlled by the timing control circuit 16 using a synchronizing signal. The synchronizing signal is transmitted by a transmitting or calling station and is received by a receiving or called station which in turn extracts the synchronizing signal by means of the sync extraction circuit 17 to make an operation timed to the calling station. The above operation enables a duplex communication (or simultaneous transmission and reception) using a single frequency.

The above-mentioned voice transmission apparatus in the radio system is disclosed by, for example, WO 91/02414 laid open on Feb. 21, 1991.

SUMMARY OF THE INVENTION

In general, a signal to be transmitted is band-limited by a splatter filter which imposes band limitation on an occupied frequency band so that the band of a transmit signal to be modulated is limited to frequencies not higher than 3 KHz. In the conventional duplex radio system, however, a voice signal to be transmitted is subjected to ½ time compression, as mentioned above. Therefore, voice signal components included in a transmit signal are restricted to a band of 0 to 1.5 KHz as compared with the band of 0 to 3 KHz in the general radio system. Therefore, the conventional duplex radio system involves a problem that there results in a secluded or confined tone, in which a high frequency portion of voice is reduced, with high-frequency components being decreased or lost, thereby deteriorating the articulation or clarity of the transmit voice signal.

An object of the present invention is to provide a voice transmission method and apparatus in a radio system in which the above-mentioned problem of the related art is eliminated.

Another object of the present invention is to provide a voice transmission method and apparatus in a radio system in which the articulation of a transmit voice signal is improved while the restriction on an occupied bandwidth of the transmit voice signal is satisfied.

According to one aspect of the present invention, there is provided a voice transmission method in a duplex radio system in which a voice signal to be transmitted in a constant period of time is subjected to 1/N time compression, N being a numeral not smaller than 2.0, the time-compressed voice signal is supplied to a transmitter as a modulating signal, a transmitting operation is performed by the transmitter in synchronism with a period of time when the signal to be modulated is inputted to the transmitter, a receiving operation of receiving a time-compressed and modulated signal transmitted from the transmitter to demodulate it is performed by a receiver in a period of time other than the period of time when the transmitting operation is performed, a demodulated signal is subjected to N-ple time expansion to obtain a reproduced receive voice signal, and both the transmitting operation and the receiving operation are repeated at the constant period of time, the method comprising the steps of extracting with a predetermined width a predetermined band of a signal corresponding to the signal to be transmitted which is in a voice band, and shifting the extracted signal to the predetermined band which is in the voice band and is other than the extracted band and supplying a signal corresponding to the shifted signal to the transmitter as the modulating signal.

Namely, in the present invention, the above-mentioned problem is solved in such a manner that a signal having the predetermined band of a signal corresponding to a signal to be transmitted, which is in a voice band and contributes to the improvement of the articulation, is extracted and frequency-shifted.

According to another aspect of the present invention, a voice transmission apparatus in the above-mentioned duplex radio system includes a unit for extracting with the predetermined width the predetermined band of the signal to be transmitted which is in a voice band and shifting the extracted signal to the predetermined band which is in the voice band and is other than the extracted band, a unit for subjecting the shifted signal to the time compression to obtain the modulating signal and supplying the obtained signal to the transmitter, a unit for subjecting a demodulated signal of the receiver to the time expansion, and a unit for shifting the band of the time-compressed signal to the extracted band to obtain the reproduced receive voice signal.

It is preferable that the unit for obtaining the modulating signal obtains the signal by imposing band limitation by a low-pass filter on the signal subjected to the time compression.

Namely, in transmission, a band limitation by a low-pass filter is imposed on a signal having an expanded frequency band resulting from the time compression following the shifting, thereby satisfying a predetermined frequency band.

According to a further aspect of the present invention, a voice transmission apparatus in the above-mentioned duplex radio system includes a unit for subjecting the voice signal to be transmitted to the time compression, a unit for extracting with the predetermined width the predetermined band of the time-compressed signal which is in a band of N times of a voice band of the signal to be transmitted and shifting the extracted signal to the predetermined band which is in the band of N times and is other than the extracted band, a unit for obtaining the modulating signal from the shifted signal and supplying the obtained signal to the transmitter, a unit for shifting the band of a demodulated signal of the receiver to the extracted band, and a unit for subjecting the signal shifted by the shifting unit to the time expansion to obtain the reproduced receive voice signal.

It is preferable that the unit for obtaining the modulating signal obtains the signal by imposing band limitation by a low-pass filter on the signal shifted by the extracting unit.

Namely, in transmission, a band limitation by a low-pass filter is imposed after the predetermined frequency band of a signal having an expanded frequency band resulting from the time compression has been extracted and frequency-shifted, thereby satisfying a predetermined frequency band.

According to a still further aspect of the present invention, a voice transmission apparatus in the above-mentioned duplex radio system includes a first modulator for amplitude-modulating the voice signal to be transmitted by a subcarrier signal having any frequency in a voice band of the voice signal to be transmitted, a first signal extracting unit for extracting a lower sideband of the signal modulated by the first modulator, a unit for subjecting the extracted sideband to the time compression to obtain the modulating signal and supplying the obtained signal to the transmitter, a unit for subjecting a demodulated signal of the receiver to the time expansion, a second modulator for amplitude-modulating the time-expanded signal by a subcarrier signal having the same frequency as the first-mentioned subcarrier signal, and a second signal extracting unit for extracting a lower sideband of the signal modulated by the second modulator to obtain the reproduced receive voice signal.

Namely, in transmission, one of both sidebands is extracted after a voice signal to be transmitted has been amplitude-modulated by a subcarrier signal, and the extracted signal is subjected to time compression.

Preferably, in the present invention, a voice signal having an expanded band resulting from the time compression by a time compression circuit is transmitted in a form band-limited with a predetermined band width by a low-pass filter. In that case, a signal of any band in a voice band is shifted to predetermined frequencies in order that a voice signal contributing the improvement of the articulation is not removed by the low-pass filter.

In a receiver, on the other hand, a voice signal having the above-mentioned voice band can be obtained by demodulating a signal subjected to the above operation, time-expanding the demodulated signal output by a time expansion circuit, amplitude-modulating an output signal of the time expansion circuit in a modulator by a subcarrier signal having the same frequency as a subcarrier used for amplitude modulation on the transmitting side, and extracting a lower sideband of an output of the modulator by a signal extracting circuit for restoration to a band before the band shift of the voice signal made on the transmitting side. Thereby, a secluded tone resulting from the decrease of high-frequency components is avoided to improve the articulation.

DESCRIPTION OF THE PREFERRED EMBODIMENTS

Figure 4A:
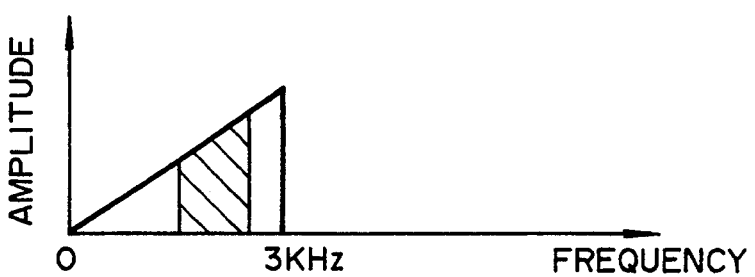
FIGS. 4A to 4D are diagrams showing frequency bands on the transmitting side for explaining the basic concept of the present invention.
Figure 4B:
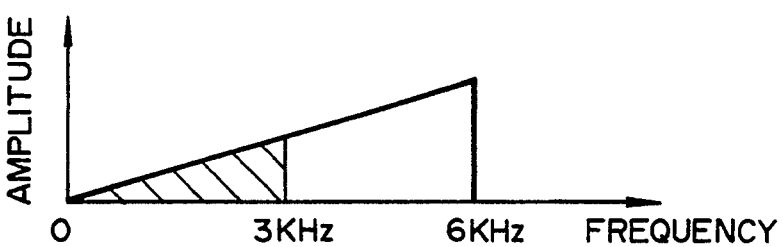

Prior to the explanation of embodiments of the present invention, the basic concept of the present invention will be explained using FIGS. 4A to 4D and FIGS. 5A and 5B. In a radio transmission path handled by the present invention, a voice signal is limited to a predetermined band of, for example, 0 to 3 KHz, as shown in FIG. 4A. When this signal is subjected to 1/N time compression (for example, N=2) in order to allow simultaneous transmission and reception with a single frequency, a frequency band of the signal is doubled, as shown in FIG. 4B. However, such a signal, so long as it is, does not satisfy the standard of 3 KHz which is a condition prescribed by the Radio Law.

In order to satisfy the standard, band limitation to 0 to 3 KHz is made using a low-pass filter such as a splatter filter so that only a portion hatched in FIG. 4B is transmitted. In this case, however, there results in a secluded voice with a high-pitched voice portion being lost, thereby deteriorating the articulation.

In order to obtain a satisfactory articulation, it is most preferable to transmit the overall voice band of 0 to 3 KHz. However, when the transmission of the overall voice band is not possible, it is expected that the deterioration of the articulation in the case where only a specified portion of the frequency band as hatched in FIG. 4A is transmitted is little as compared with that in the case where a frequency band corresponding to the lower half of the voice band as shown in FIG. 4B is transmitted.

Figure 5A:
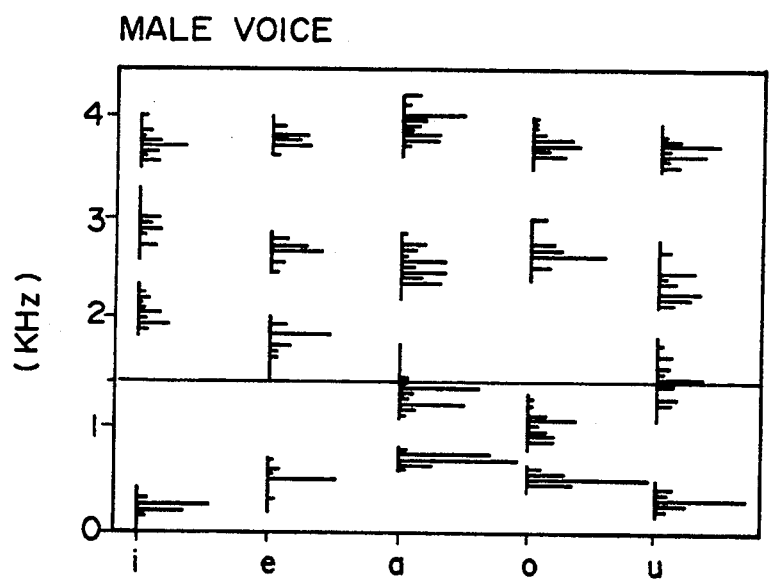
FIGS. 5A and 5B are diagrams showing the frequency spectra of voice signals.
Figure 5B:
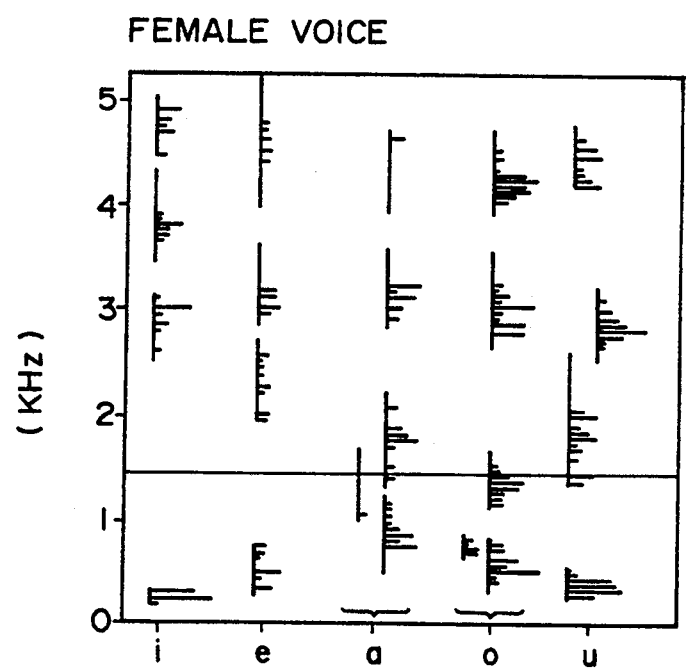

Namely, the analysis of frequency components of a voice signal has revealed that a frequency spectrum extends over a range between several-hundred hertz and 4 to 5 KHz, as shown in FIGS. 5A and 5B. FIG. 5A shows a formant distribution of five vowels of a male voice inclusive of all vowels involved in monosyllables and compositions, and FIG. 5B shows a similar formant distribution of five vowels of a female voice. In order to transmit the voice signal with a satisfactory articulation, it is necessary to transmit all of those frequency components. However, in the case where only the transmission of frequency components not higher than 1.5 KHz is possible, it is apparent from FIGS. 5A and 5B that many frequency components higher than 1.5 KHz are lost with the deterioration of the articulation. In a system of the present invention as explained hereinbelow, in the case where a transmissible frequency band width is limited to 1.5 KHz, the transmission is made selecting a band width of 1.5 KHz which optimizes the articulation of the voice. A band to be selected is previously determined based on the difference of voice quality due to sexual distinction and the preference of a speaker. According to the experiment, it has been found that the deterioration of the articulation is prevented when a frequency band from 0.6 kHz to substantially 1.9 kHz is extracted and transmitted.

Figure 4C:
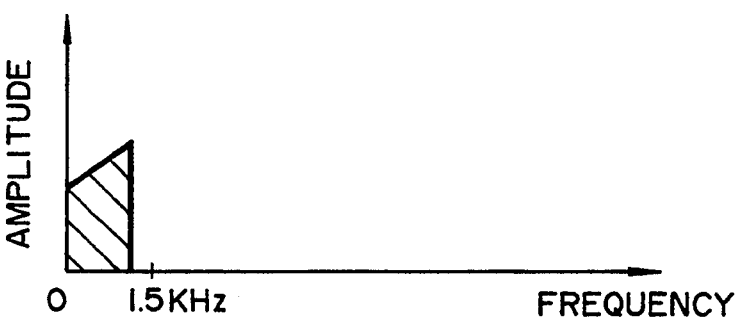
Figure 4D:
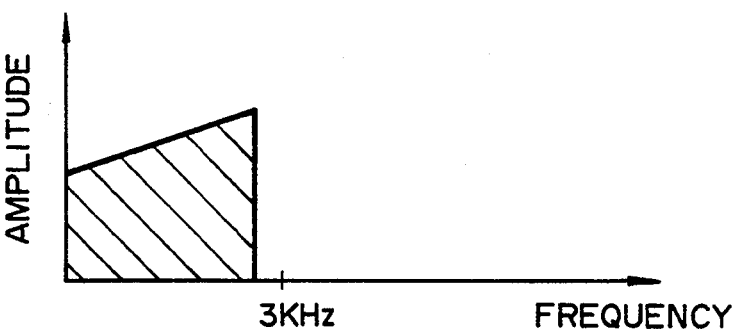

Namely, in the present invention, a band width, which is not larger than 1.5 KHz and contributes to the improvement of the articulation, is extracted from the frequency band of a voice signal, and the extracted signal portion is frequency-shifted so that the highest frequency takes a value not higher than 1.5 KHz (see FIG. 4C). If such a frequency-shifted signal is subjected to time compression, there results in that the signal to be transmitted falls in a frequency band not higher than 3 KHz (see FIG. 4D) so that the condition prescribed by the Radio Law is satisfied. Also, since the frequency band contributing to the improvement of the articulation is extracted and the highest frequency is not higher than 1.5 KHz, the extracted frequency components are transmitted without being lost even after the time compression has been made. Thereby, a practically sufficient articulation can be ensured.

A voice transmission apparatus in a single-frequency duplex radio according to an embodiment of the present invention will now be explained in reference to FIG. 3. Reference numeral 6 designates a transmit voice input terminal of the radio system. A voice signal to be transmitted, which is inputted to the transmit voice input terminal 6, is supplied to a low-pass filter (LPF) 1. An output of the LPF 1 is connected to a first input of a modulator 2. An output of the modulator 2 is inputted to a band-pass filter (BPF) 3 which serves as a signal extracting circuit. An output of the BPF 3 is inputted through a time compression circuit 7 to a low-pass filter such as a splatter filter 4 and is thereafter supplied to a transmitter 14 as an input modulating signal.

On the other hand, a demodulated output of a receiver 15 is inputted to an LPF 11 through a time expansion circuit 13. An output of the LPF 11 is connected to a first input of a modulator 10. An output of the modulator 10 is connected to a BPF 9 which serves as a signal extracting circuit. An output of the BPF 9 is connected to a receive voice output terminal 12. Each of the filters 1, 3, 9 and 11 may be a switched capacitor filter.

A first output of a frequency divider 5 supplied with a clock signal from a clock signal input terminal 8 is connected to a second input of each of the modulators 2 and 10. A second output of the frequency divider 5 is connected to a cut-off frequency control clock signal input of each of the filters 1, 3, 9 and 11.

A part of the demodulated output of the receiver 15 is inputted to a sync extraction circuit 17 and an output of the sync extraction circuit 17 is inputted to a timing control circuit 16. An output of the timing control circuit 16 is inputted to a control terminal of each of the time expansion circuit 13, the time compression circuit 7, the transmitter 14 and the receiver 15.

Next, the operation of the present embodiment will be explained. The first output of the frequency divider 5 is supplied as a subcarrier signal (for example, 2.1 KHz) to the modulator 2. The modulator 2 amplitude-modulates the output of the subcarrier signal by means of the output signal of the LPF 1 to generate the output signal of the LPF 1 in both sidebands of the subcarrier. The subcarrier signal has any frequency in a voice band, as mentioned above.

An output signal of the modulator 2 is supplied to the BPF 3 which in turn extracts signal components in a lower sideband from the voice signal components of the both sidebands to remove upper sideband and subcarrier components. Therefore, output signal components of the BPF 3 are components inverted in frequency for the signal inputted to the transmit voice input terminal 6. This signal is subjected to 1/N time compression (N=2.0 in the present example) by the time compression circuit 7 so that the frequency of an output signal of the time compression circuit 7 becomes two times as high as that of an input signal thereof. The time-compressed signal is band-limited with 3 KHz by the splatter filter 4 and is thereafter supplied to the transmitter 14 as an input modulating signal.

The band width of the BPF 3 is selected such that frequency components higher than the subcarrier are sufficiently removed and frequency components lower than the subcarrier are not attenuated. The modulator 2 is provided for inverting the voice band. The process of the above operation is shown in FIGS. 6A to 6D. A signal for modulating a transmitted carrier, which is inputted to the transmitter, is obtained by performing the operation of ½ time compression and thereafter performing the band limitation of 3 KHz by the splatter filter 4. For simplicity, however, the explanation will now be made in conjunction with the case where the time compression is omitted and the band limitation of 1.5 KHz, which is a half of 3 KHz, is thereinstead made by the splatter filter in order to provide an equivalent to the time compression.

In FIGS. 6A to 6D, a solid line represents a frequency spectrum of the output of each circuit portion, a broken line represents a frequency spectrum of the input thereof and a one-dotted chain line represents a pass band of the corresponding filter. FIGS. 6A, 6B, 6C and 6D show the frequency spectra of the LPF 1, the modulator 2, the BPF 3 and the splatter filter 4, respectively.

Figure 6A:
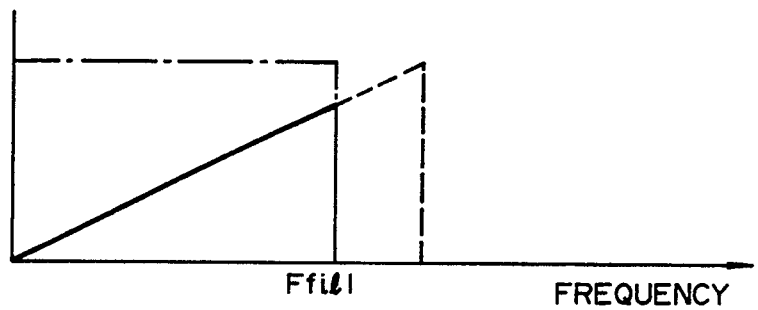
FIGS. 6A to 6D are frequency spectrum diagrams for explaining the operation of the transmitting side in the embodiment shown in FIG. 3.
Figure 6B:
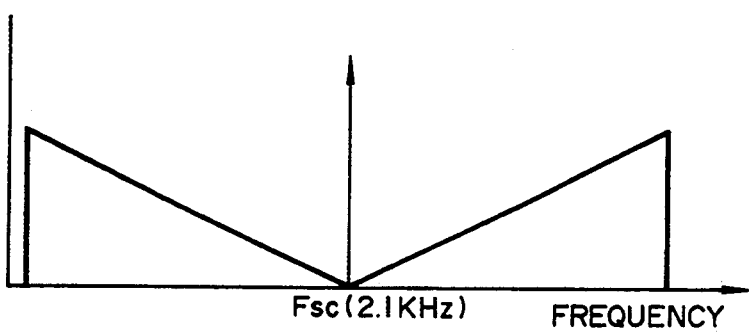
Figure 6C:
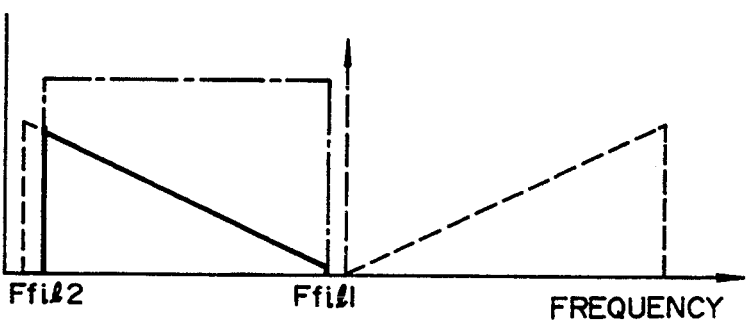
Figure 6D:
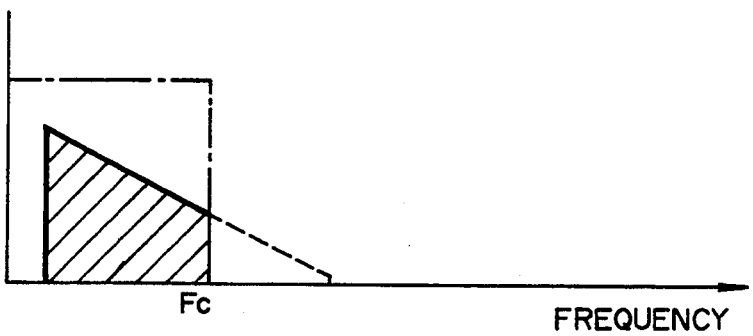

In the present apparatus, only a frequency band hatched in FIG. 6D is transmitted. Namely, an adjustment to a predetermined band is made by extracting any band in a voice band, thereafter frequency-shifting the extracted band through frequency inversion and then band-limiting the shifted signal by the splatter filter 4.

Provided that the frequency of the subcarrier, the cut-off frequency of the LPF 1, the higher cut-off frequency of the BPF 3, the lower cut-off frequency of the BPF 3 and the cut-off frequency of the splatter filter 4 are Fsc, Ffi11, Ffi11, Ffi12 and Fc, respectively, the lower limit frequency F1 of a transmission band becomes F1=Fsc−Fc and the upper limit frequency Fh thereof becomes Fh=Fsc−Ffi12.

Figure 7:
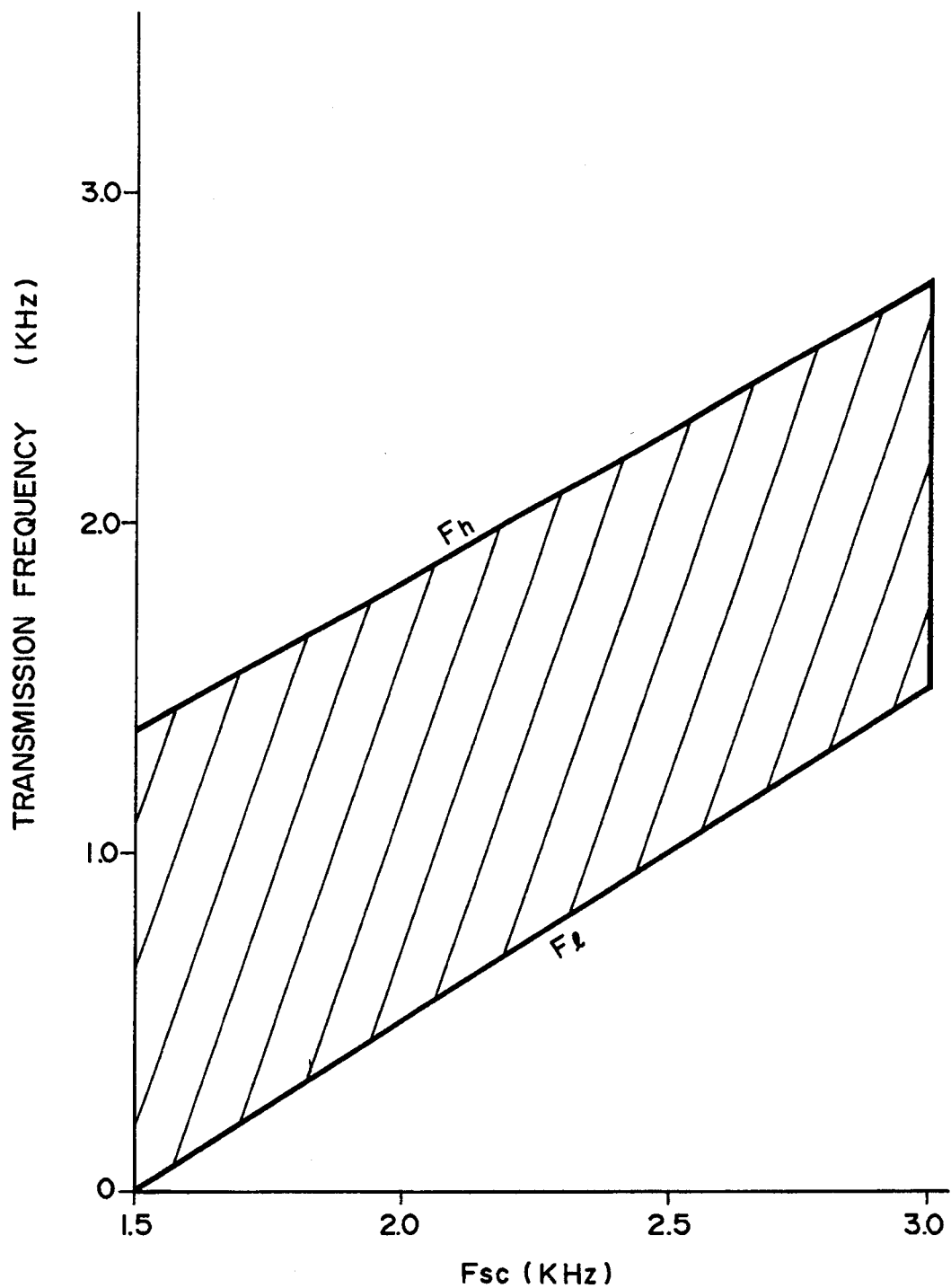
FIG. 7 is a diagram showing a relationship between an output signal and a subcarrier frequency in the embodiment shown in FIG. 3.

FIG. 7 shows a transmission frequency band (that is, a frequency band of information or voice signal components in the output of the splatter filter) for the subcarrier frequency in the case where Ffi11=Fsc×0.91 and Ffi12=Fsc×0.091. The coefficient values 0.91 and 0.091 are determined considering the selectivity of filter which can be realized. A region hatched in FIG. 7 is a voice transmission band which can be changed by making the subcarrier frequency variable. The voice transmission band in the case of Fsc=2.5 KHz has a band width of about 1.3 KHz and is one shifted to a range between 1 KHz and 2.273 KHz.

When the subcarrier frequency Fsc changes, the cut-off frequency of each band pass filter correspondingly changes. As a result, information components of the information signal at the output of the splatter filter 4 change within the hatched region.

Figure 8A:
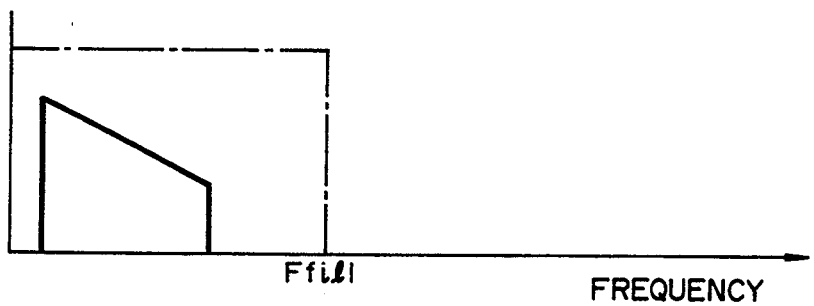
FIGS. 8A to 8D are frequency spectrum diagrams for explaining the operation of the receiving side in the embodiment shown in FIG. 3.
Figure 8B:
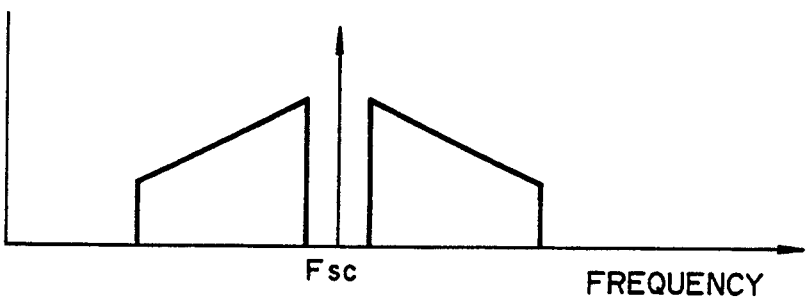
Figure 8C:
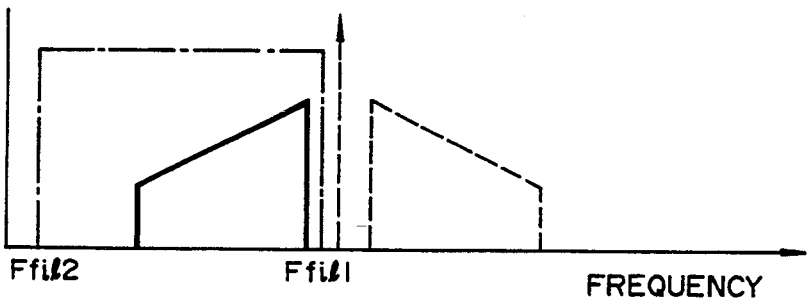
Figure 8D:
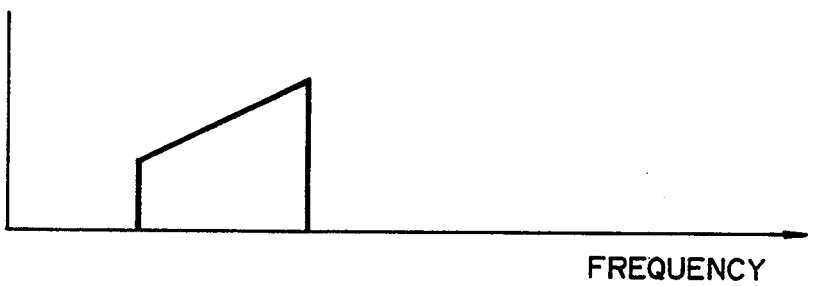

The signal transmitted to the receiver 15 includes voice components in a frequency inverted form. On the receiving side, therefore, the original voice signal components can be restored by performing an operation similar to that on the transmitting side after a demodulated output of the receiver 15 has been time-expanded. The process of this operation is shown in FIGS. 8A to 8D. FIG. 8A shows a frequency spectrum of the output of the LPF 11 by a solid line and a pass band of the LPF 11 by a one-dotted chain line. FIG. 8B shows a frequency spectrum of the output of the modulator 10 by a solid line. FIG. 8C shows a frequency spectrum of the output of the BPF 9 by a solid line, a frequency spectrum of the input of the BPF 9 by a broken line and a pass band of the BPF by a one-dotted chain line. FIG. 8D shows a frequency spectrum of the output of the receive voice output terminal 12 by a solid line.

In the above embodiment, the signal of the extracted frequency band is shifted in frequency by performing frequency inversion once. Next, explanation will be made of another embodiment of the present invention in which the frequency shift is made by performing frequency inversion twice in order to cause no inversion of a frequency characteristic, thereby diminishing the influence of noises caused by distortions which may be generated at the subsequent signal processing step.

Figure 9:
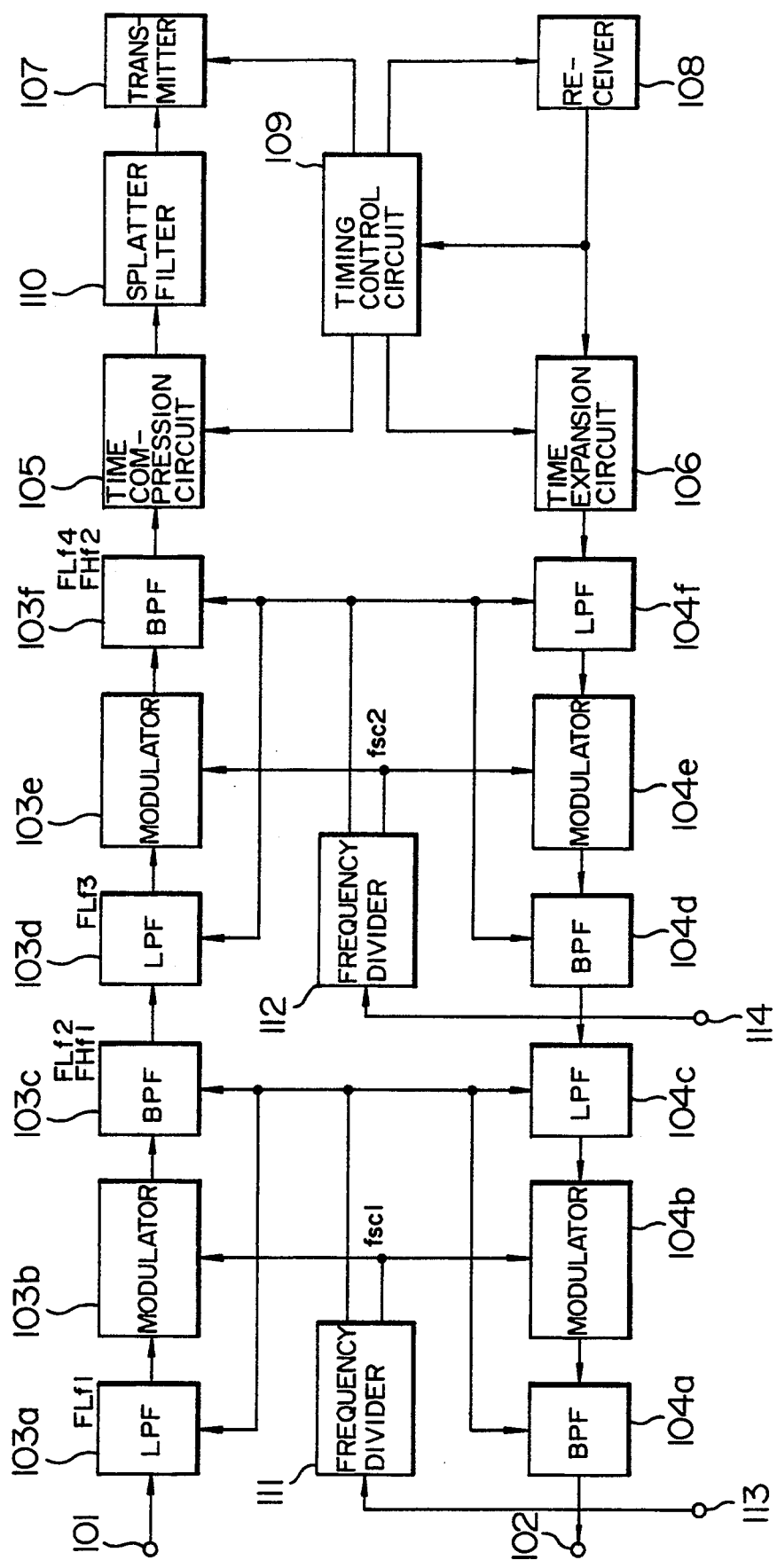
FIG. 9 is a block diagram showing the construction of a voice transmission apparatus in a duplex radio system according to another embodiment of the present invention.

FIG. 9 shows a block diagram of the other embodiment. A signal to be transmitted, which is inputted to a transmit voice input terminal 101, is supplied to a transmitter 107 through an LPF 103a, a modulator 103b, a BPF 103c, an LPF 103d, a modulator 103e, a BPF 103f, a time compression circuit 105 and an LPF such as a splatter filter 110.

On the other hand, a demodulated output of a receiver 108 is inputted to a receive voice output terminal 102 through a time expansion circuit 106, an LPF 104f, a modulator 104e, a BPF 104d, an LPF 104c, a modulator 104b and a BPF 104a. Each of the filters 103a, 103c, 103d, 103f, 104a, 104c, 104d and 104f may be a switched capacitor filter.

Reference numerals 111 and 112 designate frequency dividers. Clock signals are supplied to the frequency dividers 111 and 112 from clock signal input terminals 113 and 114. A first output of the frequency divider 111 is supplied to the modulators 103b and 104b, and a second output thereof is supplied to a cut-off frequency control input of each of the filters 103a, 103c, 104a and 104c.

The demodulated output of the receiver 15 is also supplied to a timing control circuit 109. An output of the timing control circuit 109 is inputted to a control input of each of the time expansion circuit 105, the time compression circuit 106, the transmitter 107 and the receiver 108.

Next, the operation of the present embodiment will be explained. The first output of the frequency divider 111 is supplied as a subcarrier signal to the modulator 103b. The modulator 103b amplitude-modulates the output of the divider 111 by the output signal of the filter 103a to generate both sidebands of the subcarrier. An output signal of the modulator 103b is passed through the BPF 103c to extract components in a lower sideband while removing upper sideband and subcarrier components.

A similar processing is performed for an output of the BPF 103c by the LPF 103d, the modulator 103e and the BPF 103f. An output signal of the BPF 103f is subjected to ½ time compression by the time compression circuit 105 so that the frequency of an output signal of the time compression circuit 105 becomes two times as high as that of an input signal thereof. The time-compressed signal is band-limited with 3 KHz by the splatter filter 110 and is thereafter supplied to the transmitter 107.

The process of the above operation is shown in FIGS. 10A to 10G. A signal, which is inputted to the transmitter, is obtained by performing the operation of ½ time compression and thereafter performing the band limitation of 3 KHz by the splatter filter. For simplicity, however, the explanation will now be made in conjunction with the case where the time compression is omitted and the band limitation of 1.5 KHz, which is a half of 3 KHz, is thereinstead made by the splatter filter in order to provide an equivalent to the time compression.

In FIGS. 10A to 10G, a solid line represents a frequency spectrum of the output of each circuit portion, a broken line represents a frequency spectrum of the input thereof and a one-dotted chain line represents a pass band of the corresponding filter. FIGS. 10A, 10B, 10C, 10D, 10E, 10F and 10G show the outputs of the LPF 103a, the modulator 103b, the BPF 103c, the LPF 103d, the modulator 103e, the BPF 103f and the splatter filter 110, respectively.

Now assume that the cut-off frequencies of the LPF's 103a and 103d are FLf1 and FLf3, respectively. Also assume that the lower cut-off frequencies of the BPF's 103c and 103f are FLf2 and FLf4, the higher cut-off frequencies of the BPF's 103c and 103f are FHf1 and FHf2, and the frequencies of the subcarrier signals inputted to the modulators 103b and 103e are fsc1 and fsc2. These cut-off frequencies and subcarrier frequencies are controlled by the clock signals inputted to the clock input terminals 113 and 114 and are set, in the present embodiment, as follow:

FLf1 = 0.94 × fsc1
FLf2 = 0.91 × fsc1
FHf1 = 0.091 × fsc1
FLf3 = 0.94 × fsc2
FLf4 = 0.91 × fsc2
FHf2 = 0.091 × fsc2.

First, frequency components of a voice input signal are inverted in frequency by the LPF 103a, the modulator 103b and the BPF 103c. Provided that the frequency of the input signal of the terminal 101 is Fin, the output signal frequency Fm' of the BPF 103c takes Fm' = fsc1 − Fin. When fsc1, FLf1, FLf2 and FHf1 are set to 3.3 KHz, 3.1 KHz, 3.0 KHz and 0.3 KHz, respectively, the lower and upper limits FL1 and FH1 of a transmission band at the output of the BPF 103c in terms of the band at the input terminal 101 take FL1 = fsc1 − FLf2 = 0.3 KHz and FH1 = fsc1 − FHf1 = 3.0 KHz. Namely, the band is limited to a region of 0.3 to 3.0 KHz in a general voice signal band and is inverted.

Figure 10A:
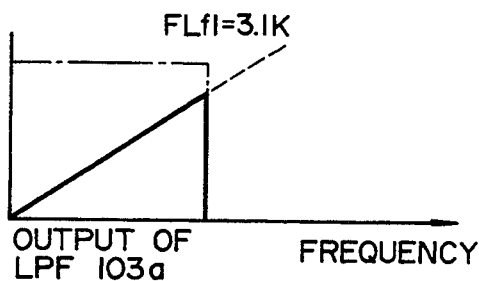
FIGS. 10A to 10G are frequency spectrum diagrams for explaining the operation of the transmitting side in the embodiment shown in FIG. 9.
Figure 10D:
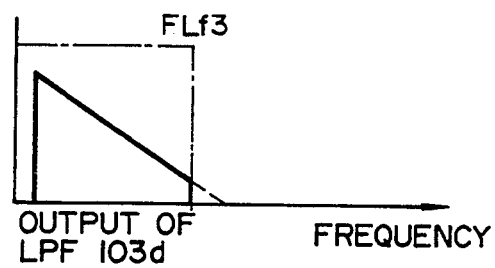
Figure 10B:
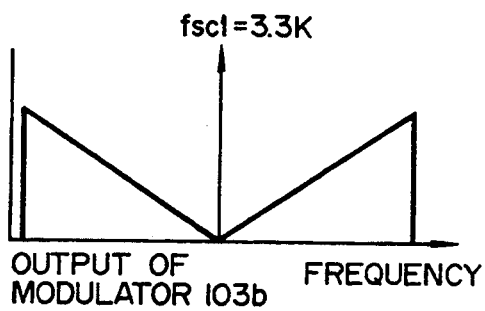
Figure 10E:
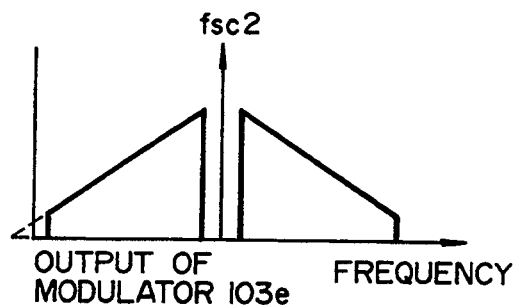
Figure 10C:
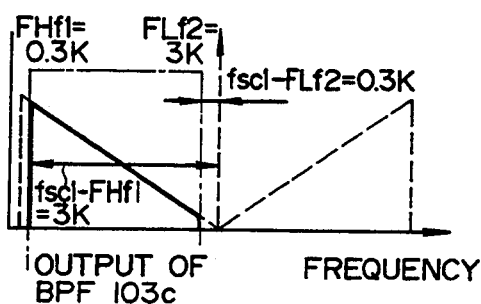
Figure 10F:
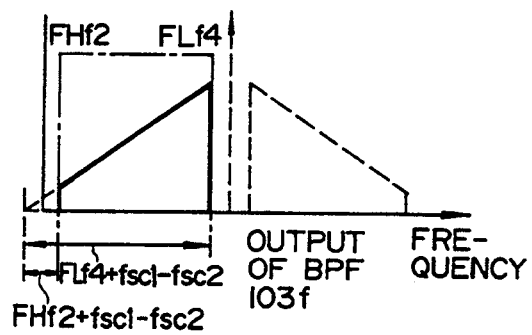
Figure 10G:
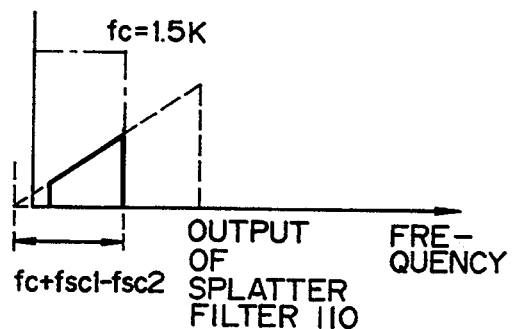

The output of the BPF 103c is then subjected by the LPF 103d, the modulator 103e and the BPF 103f to the extraction of any band and the shift of a signal of the extracted band to any band. At this time, the lower and upper limits FL2 and FH2 of a transmission band at the output of the BPF 103f in terms of the band at the input terminal 101 take FL2 = FHf2 + fsc1 − fsc2 and FH2 = FLf4 + fsc1 − fsc2, as shown in FIG. 10F.

The output of the BPF 103f is subjected to ½ time compression by the time compression circuit 105 so that the frequency of an output of the time compression circuit 105 becomes two times as high as that of an input thereof. The time-compressed signal is band-limited with 3 KHz by splatter filter 110. When considering the simplified case where the operation of time compression is omitted and the band limitation of 1.5 KHz is therein-stead made by the splatter filter in order to provide an equivalent to the time compression, the upper limit FH2 of the transmission band becomes FH2 = fc + fsc1 − fsc2 where fc is the cut-off frequency of the splatter filter.

For example, when the value of fsc2 is selected to be 3.0 KHz, FHf2 is 0.273 KHz from the above relational expression and hence FL2 and FH2 become 0.572 KHz and 1.8 KHz, respectively. Also, a signal, which is inputted to the transmitter 107, has a band of FHf2 to fc, that is, 0.273 KHz to 1.5 KHz.

Figure 11:
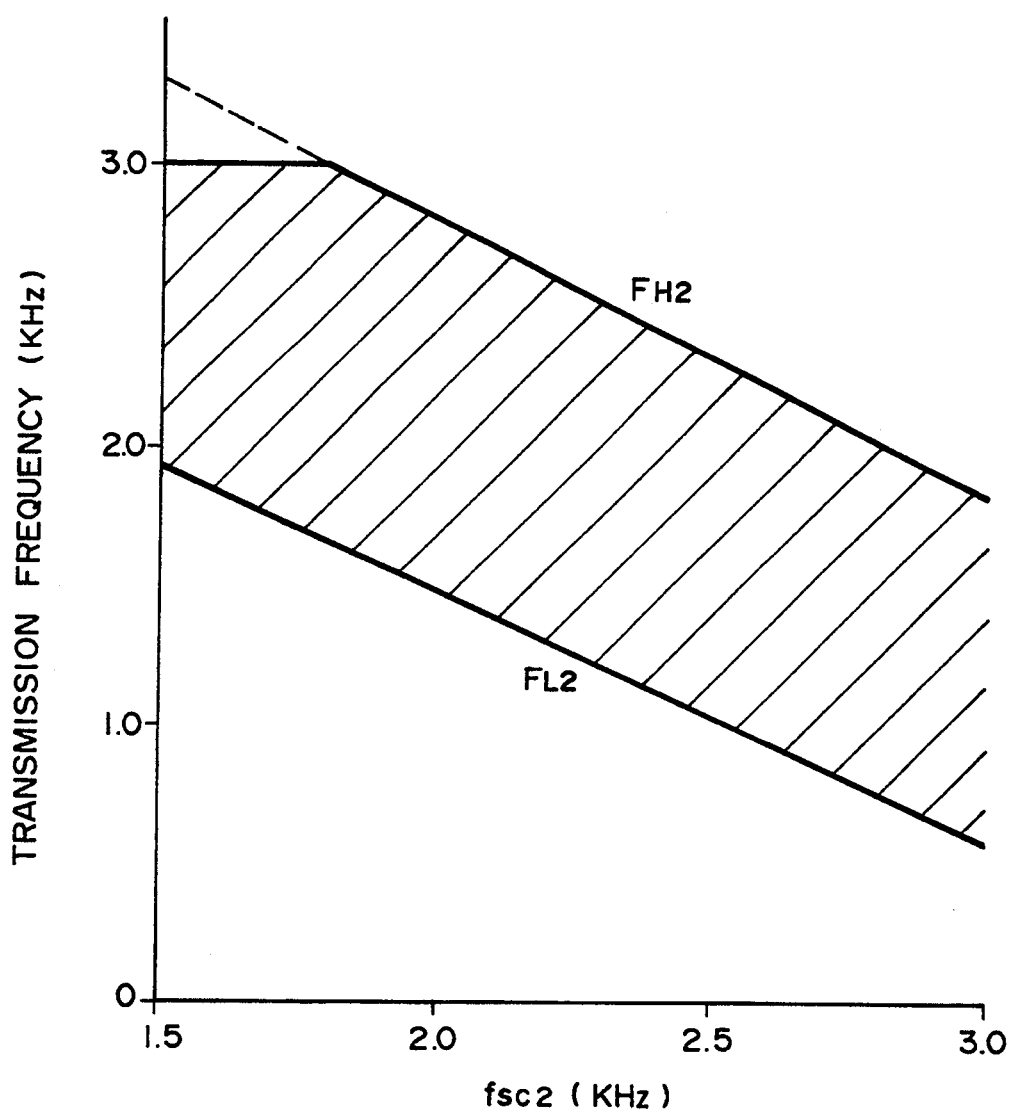
FIG. 11 is a diagram showing a relationship between an output signal and a subcarrier frequency in the embodiment shown in FIG. 9.

Accordingly, in the case of the present embodiment, a band of 0.572 to 1.8 KHz is extracted from a voice signal inputted to the transmit voice input terminal 101, and the signal of the extracted band is shifted to a band of 0.273 to 1.5 KHz and thereafter supplied to the transmitter as an input modulating signal. When the frequency fsc2 of a subcarrier signal of the modulator 103a changes, the above-mentioned frequencies FL2 and FH2 change, as shown in FIG. 11. As seen from FIG. 11, the transmission frequency does not become higher than 3 KHz. This is because the band limitation of 3 KHz is imposed.

Figure 12A:
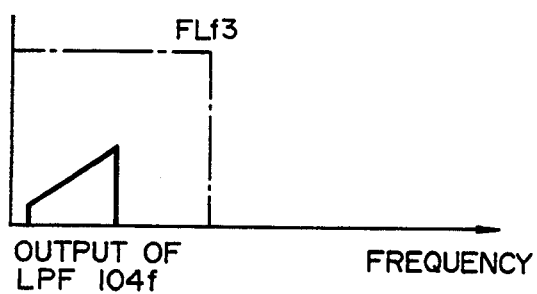
FIGS. 12A to 12F are frequency spectrum diagrams for explaining the operation of the receiving side in the embodiment shown in FIG. 9.
Figure 12D:
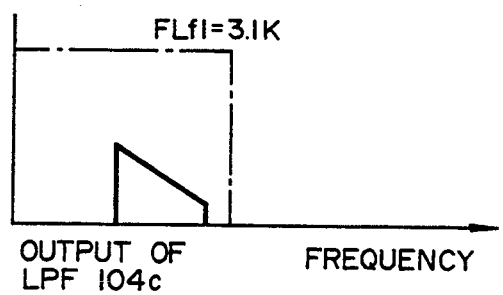
Figure 12B:
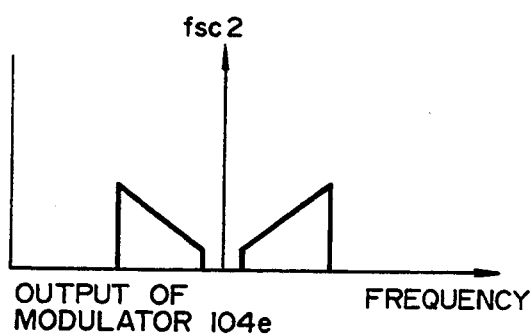
Figure 12E:
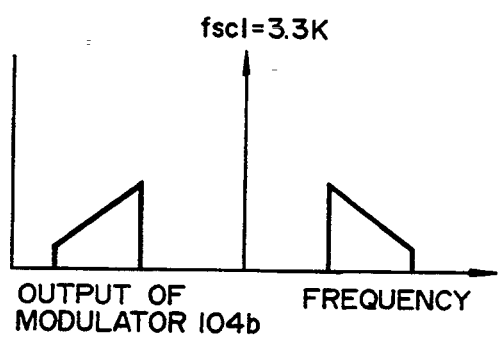
Figure 12C:
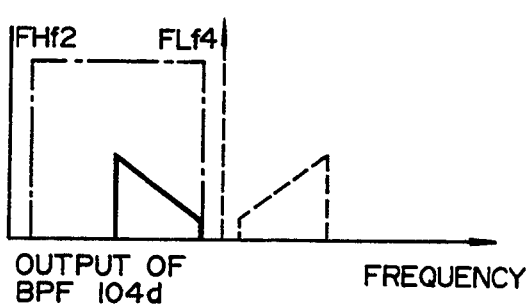
Figure 12F:
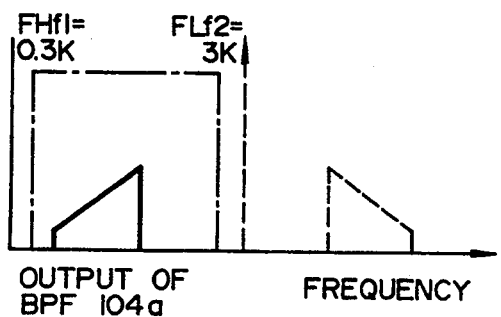

On the other hand, a demodulated output of the receiver 108 is subjected to an operation similar to that on the transmitting side. Thereby, the signal band-extracted and band-shifted on the transmitting side can be restored to the original band with the band extraction being made as it is. The process of this operation is shown in FIGS. 12A to 12F. FIG. 12A shows a frequency spectrum of the output of the LPF 104f by a solid line and a pass band of the LPF 104f by a one-dotted chain line. FIG. 12B shows a frequency spectrum of the output of the modulator 104e by a solid line. FIG. 12C shows a frequency spectrum of the output of the BPF 104d by a solid line, a frequency spectrum of the input of the BPF 104d by a broken line and a pass band of the BPF 104d by a one-dotted chain line. FIG. 12D shows a frequency spectrum of the output of the LPF 104c by a solid line and a pass band of the LPF 104c by a one-dotted chain line. FIG. 12E shows a frequency spectrum of the output of the modulator 104b by a solid line. FIG. 12F shows a frequency spectrum of the output of the BPF 104a by a solid line, a frequency spectrum of the input of the BPF 104a by a broken line and a pass band of the BPF 104a by a one-dotted chain line. The cut-off frequencies and subcarrier frequencies on the receiving side are set to the same values as those on the transmitting side.

In each of the foregoing embodiments, time compression is made after a required band has been extracted and shifted. However, a similar effect can be obtained even in the case where a required band is extracted and shifted after time compression has been made. An example of such a case is shown in FIG. 13 as a further embodiment of the present invention in which a necessary modification is made to the embodiment shown in FIG. 3.

Figure 1:
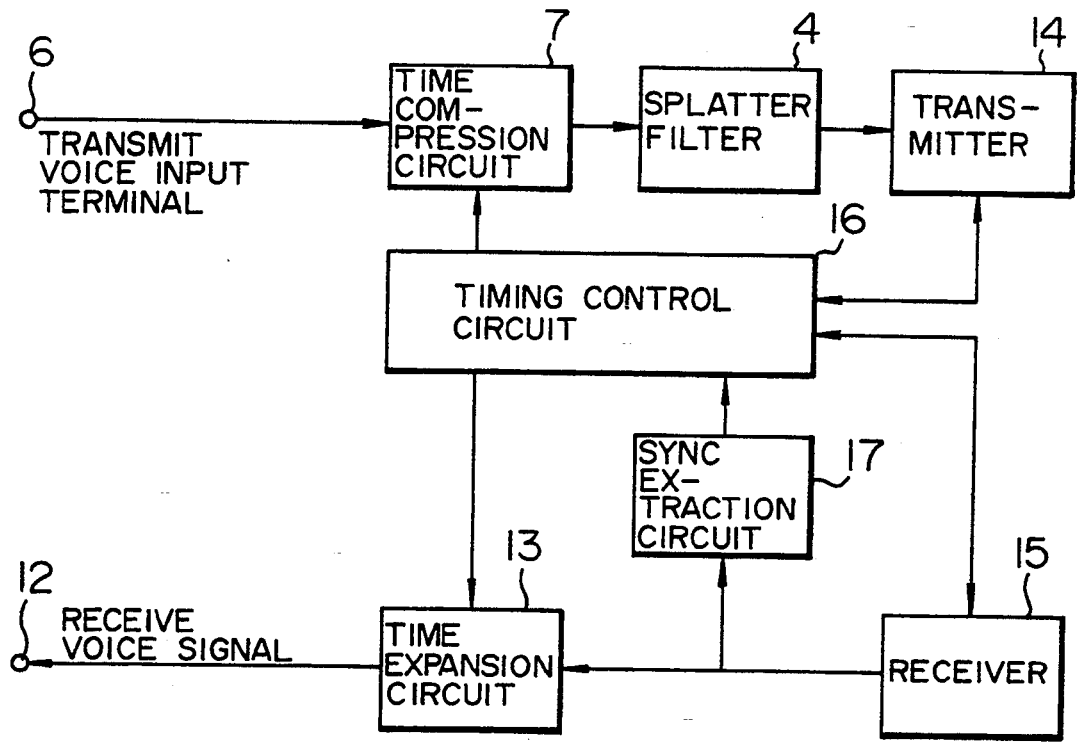
FIG. 1 is a block diagram showing the construction of the prior art of a voice transmission apparatus in a duplex radio system.
Figure 2:
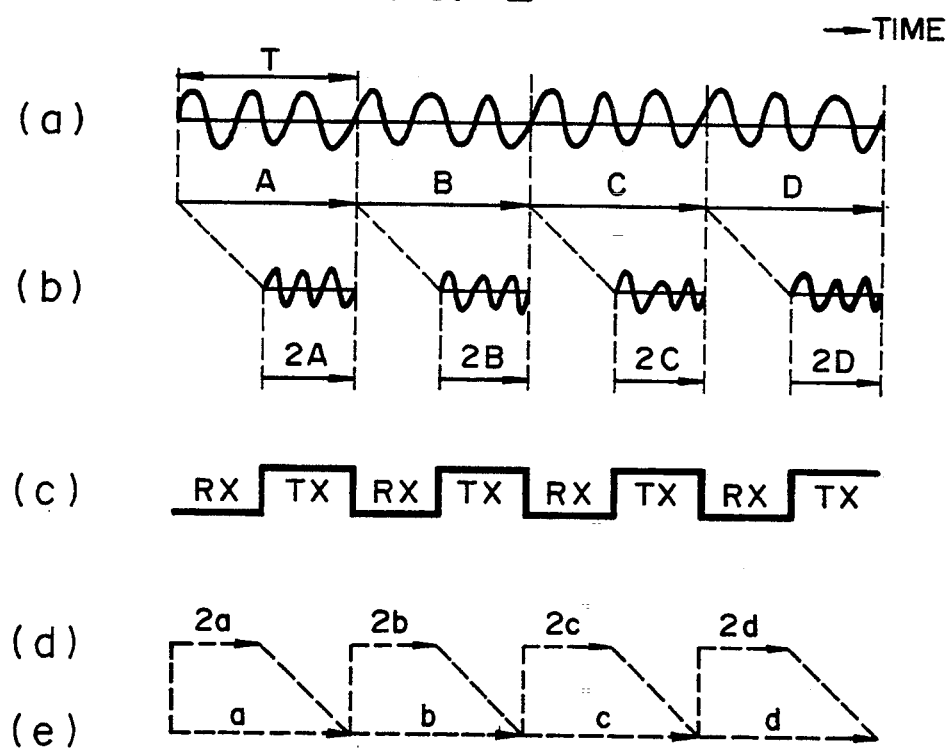
FIG. 2 is a timing chart for explaining the operation of the voice transmission apparatus shown in FIG. 1.
Figure 3:
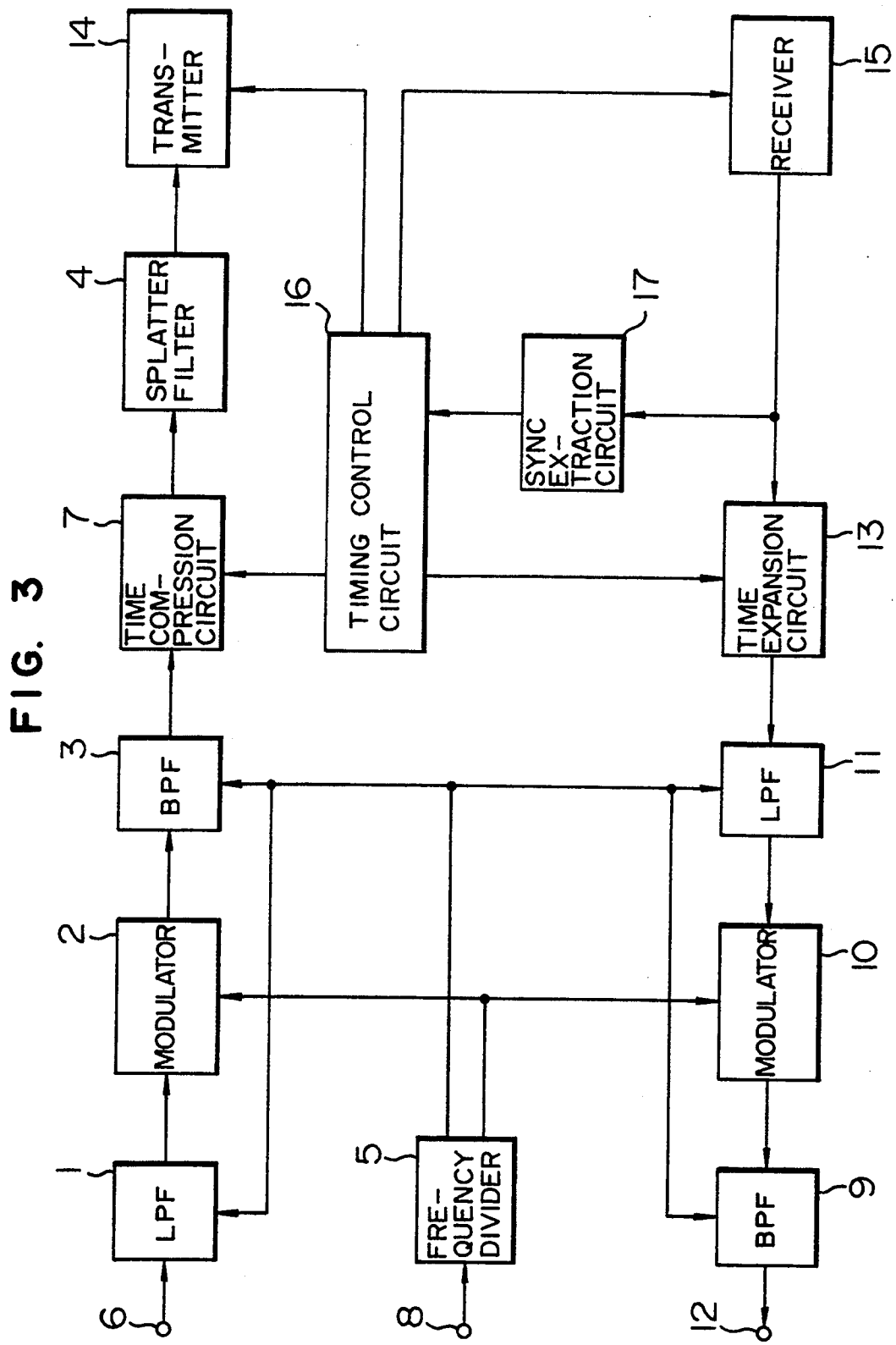
FIG. 3 is a block diagram showing the construction of a voice transmission apparatus in a duplex radio system according to an embodiment of the present invention.
Figure 13:
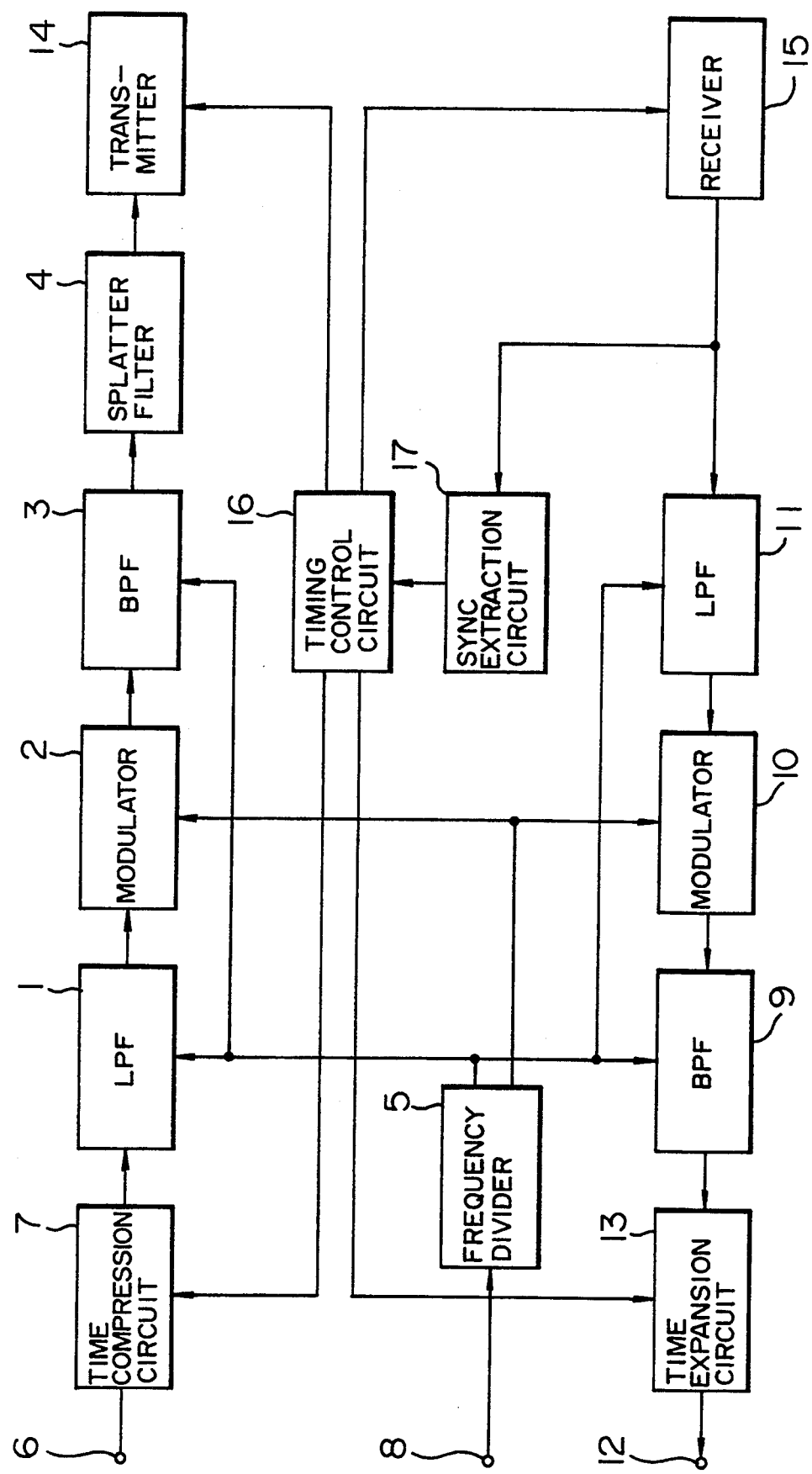
FIG. 13 is a block diagram showing the construction of a voice transmission apparatus in a duplex radio system according to a further embodiment of the present invention.

In FIG. 13, components having the same functions as those shown in FIG. 3 are designated by the same reference numerals as those used in FIG. 3. In the embodiment shown in FIG. 13, on the transmitting side, a voice signal to be transmitted is subjected to ½ time compression by a time compression circuit 7. By a modulator 2, any band of the time-compressed signal in a band of two times of a voice band of the voice signal to be transmitted is extracted with a predetermined width and shifting the extracted signal is shifted to a predetermined band in the band of two times of the extracted band. Band limitation is imposed by a splatter filter 4 on the shifted signal to obtain a signal to be modulated which is in turn supplied to a transmitter 14.

On the other hand, on the receiving side, the band of a demodulated signal of a receiver 15 is shifted by a modulator 10 to the band extracted on the transmitting side and the signal shifted by the modulator 10 is subjected to a double time expansion by a time expansion circuit 13 to obtain a reproduced receive voice signal.

In each of the foregoing embodiments, N in the 1N time compression and the N-ple time expansion is selected to be 2.0. However, N may be any number which is not smaller than 2.0 and is substantially 2.0, for example, 2.2.

Also, if the total number of transmitters and receivers in the voice transmission apparatus is M (for example, 3), N may be a value which is substantially equal to M (=3.0).

In each embodiment, the frequency shift is realized by modulation. However, it can be realized by a digital signal processor (DSP).

In the present invention as mentioned above, since any voice band can be selected by extracting any band of a voice input signal and shifting the extracted band to any band, a tone quality can be improved even in a narrow frequency band if a band contributing the improvement of the articulation is extracted.

What is claimed is:

1. A voice transmission method in a duplex radio system having a transmitter and a receiver and using one carrier frequency in which a voice signal to be transmitted in a constant period of time is subjected to 1/N time compression, N being a numeral equal to or greater than 2.0, the time-compressed voice signal is supplied to said transmitter as a modulating signal, a transmitting operation is performed by said transmitter in synchronism with a period of time when said signal is inputted to said transmitter, a receiving operation of receiving a time-compressed and modulated signal transmitted from an external transmitter to demodulate it is performed by said receiver in a period of time other than said period of time when said transmitting operation is performed, a demodulated signal is subjected to N-ple time expansion to obtain a reproduced receive voice signal, and both said transmitting operation and said receiving operation are repeated at said constant period of time, the method comprising the steps of:

extracting with a predetermined bandwidth a predetermined band of a signal corresponding to said signal to be transmitted which is in a voice band; and shifting the extracted signal to the predetermined band which is in said voice band and is other than the extracted band and supplying a signal corresponding to the shifted signal to said transmitter as said signal to be modulated.

2. A voice transmission method according to claim 1, wherein said extracted predetermined width is a band between 0.6 kHz and substantially 1.9 kHz of the voice band.

3. A voice transmission apparatus in a duplex radio system having a transmitter and a receiver and using one carrier frequency in which a voice signal to be transmitted in a constant period of time is subjected to 1/N time compression, N being a numeral equal to or greater than 2.0, the time-compressed voice signal is supplied to said transmitter as a modulating signal, a transmitting operation is performed by said transmitter in synchronism with a period of time when said signal to be modulated is inputted to said transmitter, a receiving operation of receiving a time-compressed and modulated signal transmitted from an external transmitter to demodulate it is performed by said receiver in a period of time other than said period of time when said transmitting operation is performed, a demodulated signal is subjected to N-ple time expansion to obtain a reproduced receive voice signal, and both said transmitting operation and said receiving operation are repeated at said constant period of time, the apparatus comprising:

means for extracting with a predetermined bandwidth a predetermined band of said signal to be transmitted which is in a voice band and shifting the extracted signal to the predetermined band which is in said voice band and is other than the extracted band;

means for subjecting the shifted signal to said time compression to obtain said modulating signal and supplying the obtained signal to said transmitter;

means for subjecting a demodulated signal of said receiver to said time expansion; and means for shifting the band of the time-compressed signal to said extracted band to obtain said reproduced receive voice signal.

4. A voice transmission apparatus in a duplex radio system using one carrier frequency according to claim 3, wherein said means for obtaining said modulating signal obtains said signal by imposing band limitation by a low-pass filter on the signal subjected to said time compression.

5. A voice transmission apparatus in a duplex radio system according to claim 3, wherein said extracted predetermined width is a band between 0.6 kHz and substantially 1.9 kHz of the voice band.

6. A voice transmission apparatus in a duplex radio system having a transmitter and a receiver and using one carrier frequency in which a voice signal to be transmitted in a constant period of time is subjected to 1/N time compression, N being a numeral equal to or greater than 2.0, the time-compressed voice signal is supplied to a transmitter as a modulating signal, a transmitting operation is performed by said transmitter in synchronism with a period of time when said signal is inputted to said transmitter, a receiving operation of receiving a time-compressed and modulated signal transmitted from an external transmitter to demodulate it is performed by said receiver in said period of time other than said period of time when said transmitting operation is performed, a demodulated signal is subjected to N-ple time expansion to obtain a reproduced receive voice signal, and both said transmitting operation and said receiving operation are repeated at said constant period of time, the apparatus comprising:

means for subjecting said voice signal to be transmitted to said time compression;

means for extracting with a predetermined bandwidth a predetermined band of the time-compressed signal which is in a band of N times of a voice band of said voice signal to be transmitted and shifting the extracted signal to the predetermined band which is in said band of N times and is other than the extracted band;

means for obtaining a signal from the shifted signal and supplying said signal to said transmitter;

means for shifting the band of a demodulated signal of said receiver to said extracted band; and means for subjecting the signal shifted by said shifting means to said time expansion to obtain said reproduced receive voice signal.

7. A voice transmission apparatus in a duplex radio system using one carrier frequency according to claim 5, wherein said means for obtaining said modulating signal obtains said signal by imposing band limitation by a low-pass filter on the signal shifted by said extracting means.

8. A voice transmission apparatus in a duplex radio system according to claims 5, wherein said extracted predetermined width is a band between 0.6 kHz and substantially 1.9 kHz of the voice band.

9. A voice transmission apparatus in a duplex radio system having a transmitter and a receiver and using one carrier frequency in which a voice signal to be transmitted in a constant period of time is subjected to 1/N time compression, N being a numeral equal to or greater than 2.0, the time-compressed voice signal is supplied to said transmitter as a modulating signal, a transmitting operation is performed by said transmitter in synchronism with a period of time when said signal is inputted to said transmitter, a receiving operation of receiving a time-compressed and modulated signal transmitted from an external transmitter to demodulate it is performed by said receiver in a period of time other than said period of time when said transmitting operation is performed, a demodulated signal is subjected to N-ple time expansion to obtain a reproduced receive voice signal, and both said transmitting operation and said receiving operation are repeated at said constant period of time, the apparatus comprising:

- a first modulator for amplitude-modulating a subcarrier signal by said voice signal to be transmitted, said subcarrier having any frequency in a voice band of said voice signal to be transmitted;
- first signal extracting means for extracting a lower sideband of the modulated signal from said first modulator;
- means for subjecting the extracted sideband to said time compression to obtain said modulating signal and supplying the signal to said transmitter;
- means for subjecting a demodulated signal of said receiver to said time expansion;
- a second modulator for amplitude-modulating a subcarrier signal having the same frequency as the first-mentioned subcarrier signal by the time-expanded signal; and
- second signal extracting means for extracting a lower sideband of the modulated signal from said second modulator to obtain said reproduced receive voice signal.

10. A voice transmission method in a duplex radio system having a transmitter and a receiver and using one carrier frequency in which a voice signal to be transmitted in a constant period of time is subjected to 1/N time compression, N being a numeral equal to or greater than 2.0, the time-compressed voice signal is supplied to said transmitter as a modulating signal, a transmitting operation is performed by said transmitter in synchronism with a period of time when said signal is inputted to said transmitter, a receiving operation of receiving a time-compressed and modulated signal transmitted from an external transmitter to demodulate it is performed by said receiver in a period of time other than said period of time when said transmitting operation is performed, a demodulated signal is subjected to N-ple time expansion to obtain a reproduced receive voice signal, and both said transmitting operation and said receiving operation are repeated at said constant period of time, the method comprising the steps of:

- extracting with a predetermined bandwidth a predetermined band of a signal corresponding to said signal to be transmitted which is in a voice band; and
- shifting the extracted signal to the predetermined band which is in said voice band and supplying a signal corresponding to the shifted signal to said transmitter as said signal to be modulated.

* * * * *

UNITED STATES PATENT AND TRADEMARK OFFICE
CERTIFICATE OF CORRECTION

PATENT NO. : 5,355,363
DATED : October 11, 1994
INVENTOR(S) : K. Takahashi, et al.

It is certified that error appears in the above-indentified patent and that said Letters Patent is hereby corrected as shown below:

On the Title page of Takahashi, et al., left-hand column in the section "[73] Assignees:", line 2 of this section, please delete "Tohoki Electric Power Co.," and insert -- Tohoku Electric Power Co., --

Signed and Sealed this

Twenty-fourth Day of March, 1998

Attest:

BRUCE LEHMAN

Attesting Officer          Commissioner of Patents and Trademarks